(12) United States Patent
Shibuya

(10) Patent No.: US 12,086,492 B2
(45) Date of Patent: Sep. 10, 2024

(54) STORAGE MEDIUM, INFORMATION PROCESSING APPARATUS, AND CONTROL METHOD

(71) Applicant: CANON KABUSHIKI KAISHA, Tokyo (JP)

(72) Inventor: Yoichiro Shibuya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/172,991

(22) Filed: Feb. 22, 2023

(65) Prior Publication Data

US 2023/0273759 A1    Aug. 31, 2023

(30) Foreign Application Priority Data

Feb. 28, 2022   (JP) ................... 2022-030018

(51) Int. Cl.
*G06F 3/12*   (2006.01)
(52) U.S. Cl.
CPC ............ *G06F 3/1288* (2013.01); *G06F 3/121* (2013.01); *G06F 3/1232* (2013.01); *G06F 3/1234* (2013.01); *G06F 3/1287* (2013.01); *G06F 3/1293* (2013.01)
(58) Field of Classification Search
CPC ...... G06F 3/1288; G06F 3/121; G06F 3/1232; G06F 3/1234; G06F 3/1287; G06F 3/1293; G06F 3/1203; G06F 3/1219; G06F 3/1247; G06F 3/1239
See application file for complete search history.

(56) References Cited

U.S. PATENT DOCUMENTS

| | | | | |
|---|---|---|---|---|
| 2010/0302573 A1* | 12/2010 | Hakozaki | ............... | G06F 3/1267 358/1.14 |
| 2013/0120794 A1* | 5/2013 | Kamoi | ................... | G06F 3/1236 358/1.15 |
| 2017/0277482 A1* | 9/2017 | Asai | ....................... | G06F 3/1247 |

FOREIGN PATENT DOCUMENTS

| | | | |
|---|---|---|---|
| JP | 2016175248 A | 10/2016 | |
| JP | 6672596 B2 | 3/2020 | |

* cited by examiner

*Primary Examiner* — John R Wallace
(74) *Attorney, Agent, or Firm* — Canon U.S.A., Inc. IP Division

(57) ABSTRACT

A non-transitory computer-readable storage medium stores computer-executable instructions that, when executed by a computer of an information processing apparatus capable of communicating with a printing apparatus, cause the computer to perform a method including acquiring print data on which print processing is to be performed by the printing apparatus, acquiring restriction information concerning printing about a server located outside the information processing apparatus and capable of communicating with the printing apparatus, and, in a case where information concerning the print data satisfies a predetermined condition that is based on the restriction information, performing processing for performing notification about an error in which print processing is not performed.

21 Claims, 10 Drawing Sheets

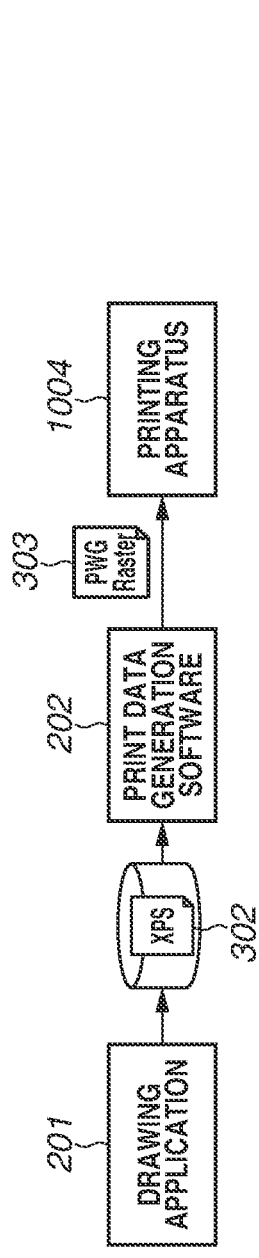
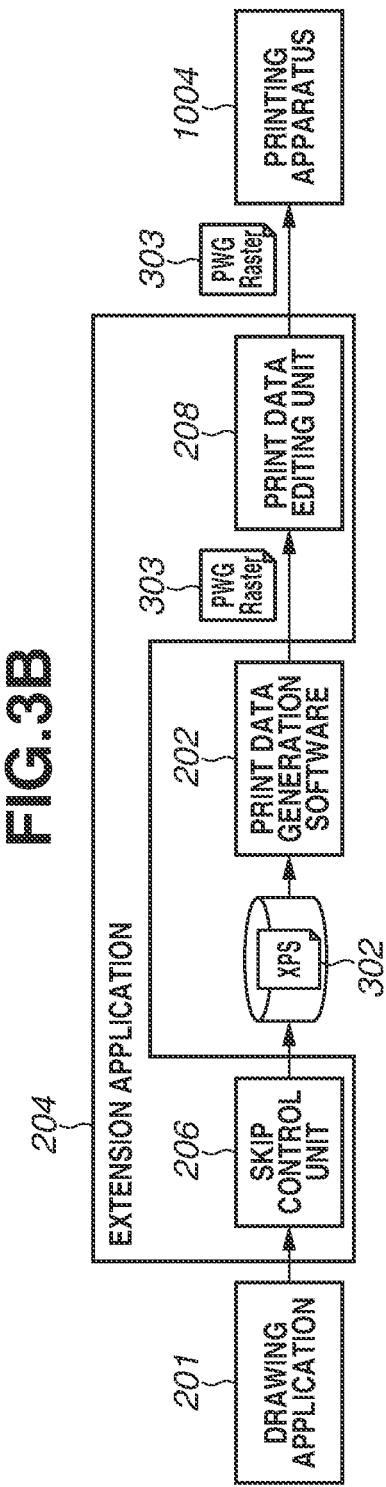
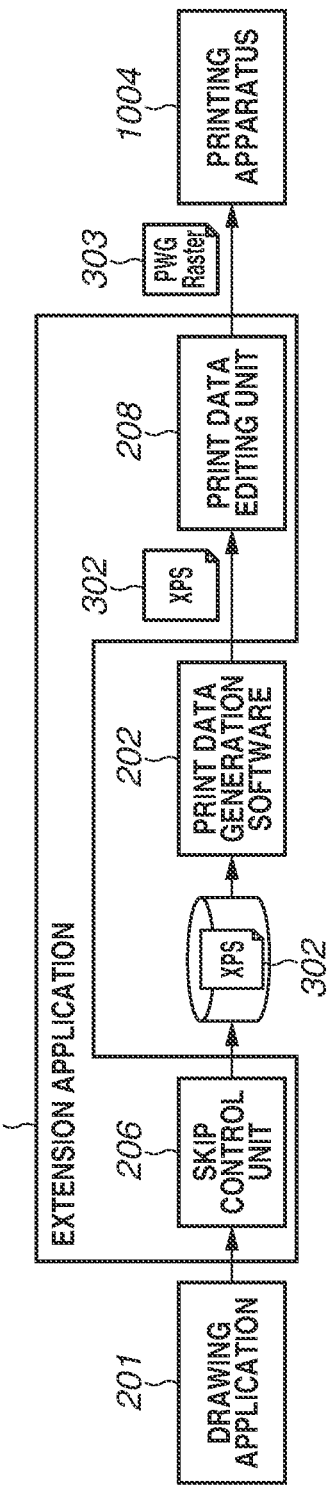

FIG.6

| TYPE OF PRINTING APPARATUS | CONNECTION CONFIGURATION | EXISTENCE OF RESTRICTION |
|---|---|---|
| INKJET PRINTER | INDIRECT COMMUNICATION CONFIGURATION | YES |
| LASER BEAM PRINTER | INDIRECT COMMUNICATION CONFIGURATION | NO |

FIG.7

| TYPE OF RESTRICTION | LIMIT |
|---|---|
| Page Count | 100 |
| File Size | 100 MB |

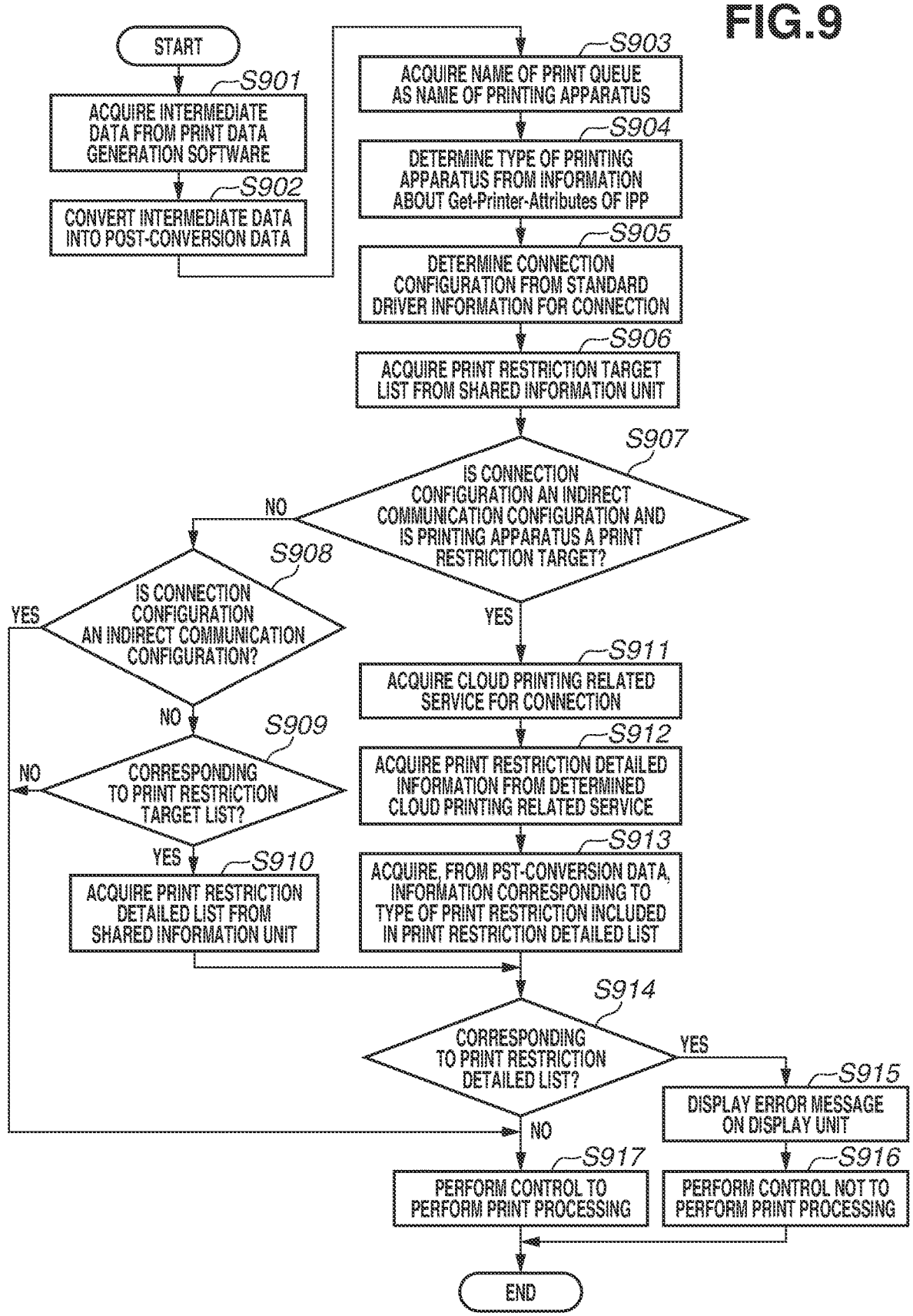

FIG.10

| TYPE OF PRINTING APPARATUS | CONNECTION CONFIGURATION | CLOUD PRINTING RELATED SERVICE IN WHICH RESTRICTION EXISTS |
|---|---|---|
| INKJET PRINTER | INDIRECT COMMUNICATION CONFIGURATION | CLOUD PRINTING INTERMEDIARY SERVICE A |

STORAGE MEDIUM, INFORMATION PROCESSING APPARATUS, AND CONTROL METHOD

BACKGROUND

Field of the Disclosure

Aspects of the present disclosure generally relate to a storage medium, an information processing apparatus, and a control method.

Description of the Related Art

There is known a printing service which allows an information processing apparatus such as a personal computer to use cloud computing. In such a service, the information processing apparatus issues a print request to a cloud printing service and the cloud printing service transmits the print request to a printing apparatus associated with the print request.

This operation enables performing printing via cloud computing, such as discussed in Japanese Patent No. 6,672,596.

However, with regard to the cloud printing service, further improvement of convenience is currently requested.

SUMMARY

According to embodiments of the present disclosure, a non-transitory computer-readable storage medium stores computer-executable instructions that, when executed by a computer of an information processing apparatus capable of communicating with a printing apparatus, cause the computer to perform a method including acquiring print data on which print processing is to be performed by the printing apparatus, acquiring restriction information concerning printing about a server located outside the information processing apparatus and capable of communicating with the printing apparatus, and, in a case where information concerning the print data satisfies a predetermined condition that is based on the restriction information, performing processing for performing notification about an error in which print processing is not performed.

Further features of the present disclosure will become apparent from the following description of exemplary embodiments with reference to the attached drawings.

BRIEF DESCRIPTION OF THE DRAWINGS

FIGS. 3A, 3B, and 3C are diagrams illustrating the flow of data concerning printing and formats of the data.

FIG. 6 is a diagram illustrating an example of a print restriction target list.

FIG. 7 is a diagram illustrating an example of a print restriction detailed list.

FIG. 9 is a flowchart of processing which is performed by the print data editing unit in a second exemplary embodiment.

FIG. 10 is a diagram illustrating an example of a cloud printing related service list.

DESCRIPTION OF THE EMBODIMENTS

Various exemplary embodiments, features, and aspects of the disclosure will be described in detail below with reference to the drawings. In this regard, however, it should be understood that embodiments obtained by appropriately making alternations or improvements to the exemplary embodiments described below based on the ordinary knowledge of one skilled in the art within the range not departing from the gist of the present disclosure also fall within the scope of the present disclosure.

Figure 1:
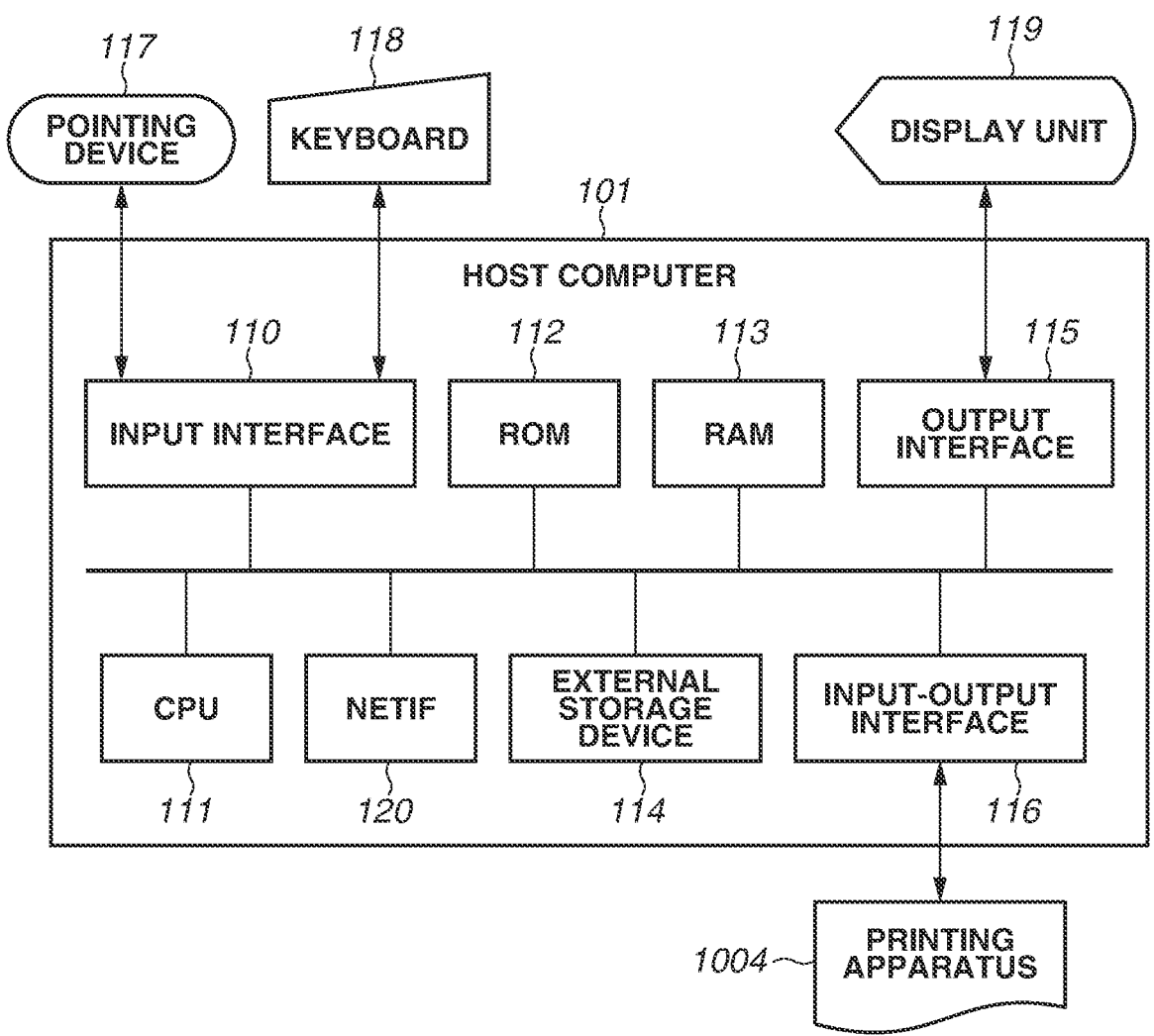
FIG. 1 is a diagram illustrating a configuration of hardware of a printing system.

An information processing apparatus and a printing apparatus which are included in a printing system according to a first exemplary embodiment are described with reference to FIG. 1. A host computer 101, which is an example of the information processing apparatus, includes an input interface 110, a central processing unit (CPU) 111, a read-only memory (ROM) 112, a random access memory (RAM) 113, an external storage device 114, an output interface 115, and an input-output interface 116. Moreover, input devices such as a keyboard 118 and a pointing device 117 are connected to the input interface 110, and a display device such as a display unit 119 is connected to the output interface 115. A network interface (NETIF) 120, which is also included in the host computer 101, performs control to perform data transfer between the host computer 101 and an external apparatus via a network.

An initialization program is preliminarily stored in the ROM 112. A group of application programs, an operating system (OS), print data generation software, and other various pieces of data are preliminarily stored in the external storage device 114. An extension application 204 described below is also preliminarily stored in the external storage device 114. The RAM 113 is used as, for example, a work memory in execution of various programs stored in the external storage device 114, so that such various programs are configured to be able to run in the host computer 101.

Furthermore, in the first exemplary embodiment, the CPU 111 performs processing according to procedures of programs stored in the ROM 112, thus executing functions described below in the host computer 101 and processing operations illustrated in a flowcharts described below.

A printing apparatus 1004 is connected to the host computer 101 via the input-output interface 116. Here, the host computer 101 and the printing apparatus 1004 are configured as separate entities, but can be configured integrally as one information processing apparatus. Furthermore, a printing apparatus 1005 described below also has a configuration similar to that of the printing apparatus 1004.

Furthermore, while, in the first exemplary embodiment, the host computer 101 is illustrated as an example of the information processing apparatus, the first exemplary embodiment is not limited to this. For example, various apparatuses such as a portable terminal, a personal computer, a tablet terminal, a personal digital assistant (PDA), and a digital camera, can be applied as the information processing apparatus. Moreover, while, in the first exemplary embodiment, a printer is illustrated as an example of the printing apparatus 1004, for example, an inkjet type printer (inkjet printer), a full-color laser beam (electrophotographic) type printer (laser beam printer), and a monochrome printer can be applied as the printing apparatus 1004.

Furthermore, there is known a configuration which uses a printer driver installed on the host computer 101 as control software for the printing apparatus 1004 and issues a print instruction to the printing apparatus 1004 connected to the host computer 101. An operating system (OS) serving as basic software is preliminarily installed on the host computer 101, and the printer driver is configured according to specifications defined by the OS and is invoked from the OS to run in the host computer 101. A vendor which provides the printing apparatus 1004 provides a printer driver compatible with the specifications of the OS, thus being able to provide a method for issuing an instruction for printing to the printing apparatus 1004 with use of the OS. Recently, in Windows®, a standard class driver (hereinafter referred to as a "standard driver") which is able to be used in common in printing apparatuses which a plurality of vendors provides has been being provided. Such a standard driver is included in a package of the OS and becomes usable in response to the user connecting an optional printing apparatus to the host computer 101. Therefore, using the standard driver removes the need to separately install a model-specific printer driver adapted for the printing apparatus 1004 and is thus high in convenience. Moreover, the standard driver is configured to be able to designate a print function according to PrintCapabilities generated based on information acquired from the connected printing apparatus 1004. With this configuration, the user who uses the standard driver is allowed to designate a print function corresponding to the capability of the connected printing apparatus 1004 although using a single standard driver. Furthermore, in the description of the first exemplary embodiment, the standard driver is assumed to be print data generation software 202.

Here, it is possible to associate an application for function extension (extension application 204) with the standard driver. The extension application 204 is able to be provided by a vendor which provides the printing apparatus 1004. The vendor, which provides the extension application 204, is thus able to provide a function (extension function) which is not able to be implemented with use of only the standard driver.

The extension application 204 is software for extending the function of print data generation software 202 described below, which is equivalent to the standard driver, and is software which is not preliminarily included (is not bundled) in the OS. Therefore, the user needs to download the extension application 204 from a server via the Internet with use of the host computer 101 and then install the extension application 204 on the host computer 101. Alternatively, the extension application 204 can be configured to be automatically installed on the host computer 101 in response to the printing apparatus 1004 being connected to the host computer 101. Specifically, in a case where the printing apparatus 1004 has been connected to the host computer 101, the OS can acquire device identification information (device ID) from the printing apparatus 1004. The OS can download an extension application 204 corresponding to the acquired device identification information from a server via the Internet and then install the extension application 204 on the host computer 101. Thus, the print data generation software 202 and the extension application 204 are retained as separate files in the host computer 101. Furthermore, while the print data generation software 202 and the extension application 204 may be updated for version upgrade, the respective update processing operations are performed at different timings. Thus, the timing at which the print data generation software 202 is acquired by the host computer 101 and the timing at which the extension application 204 is acquired by the host computer 101 are different from each other. Moreover, a trigger with which the print data generation software 202 is acquired by the host computer 101 and a trigger with which the extension application 204 is acquired by the host computer 101 are also different from each other. Furthermore, in a case where the extension application 204 has been installed on by the host computer 101, the OS associates the extension application 204 with the print data generation software 202 and the printing apparatus 1004.

The extension application 204 described in the first exemplary embodiment includes a print setting screen extension unit 205, a skip control unit 206, a print function extension unit 207, a print data editing unit 208, and a notification unit 209. Moreover, the extension application 204 further includes shared information (shared information unit) 210 which is able to be accessed in common from each unit. The entity of the shared information 210 is files stored in the external storage device 114 or information stored on the RAM 113. The extension application 204 uses an application programming interface (API) which the OS provides, thus performing writing to and reading from the shared information 210.

Figure 2A:
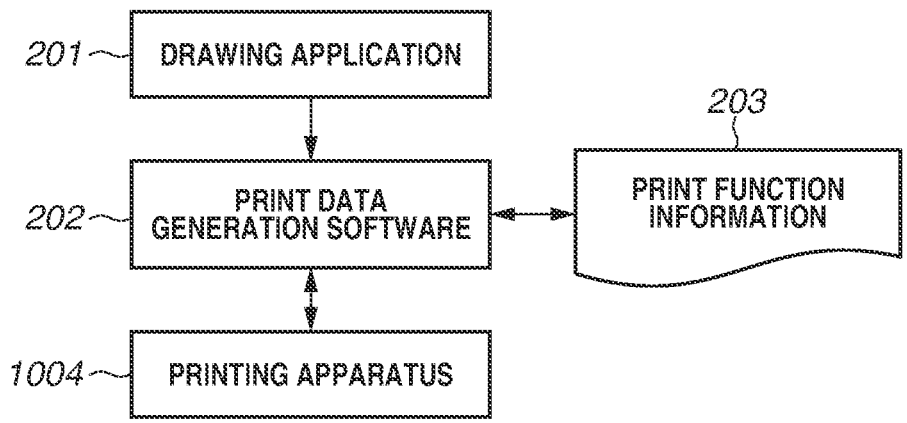
FIGS. 2A and 2B are diagrams illustrating configurations of each piece of software of an information processing apparatus and a printing apparatus.
Figure 2B:
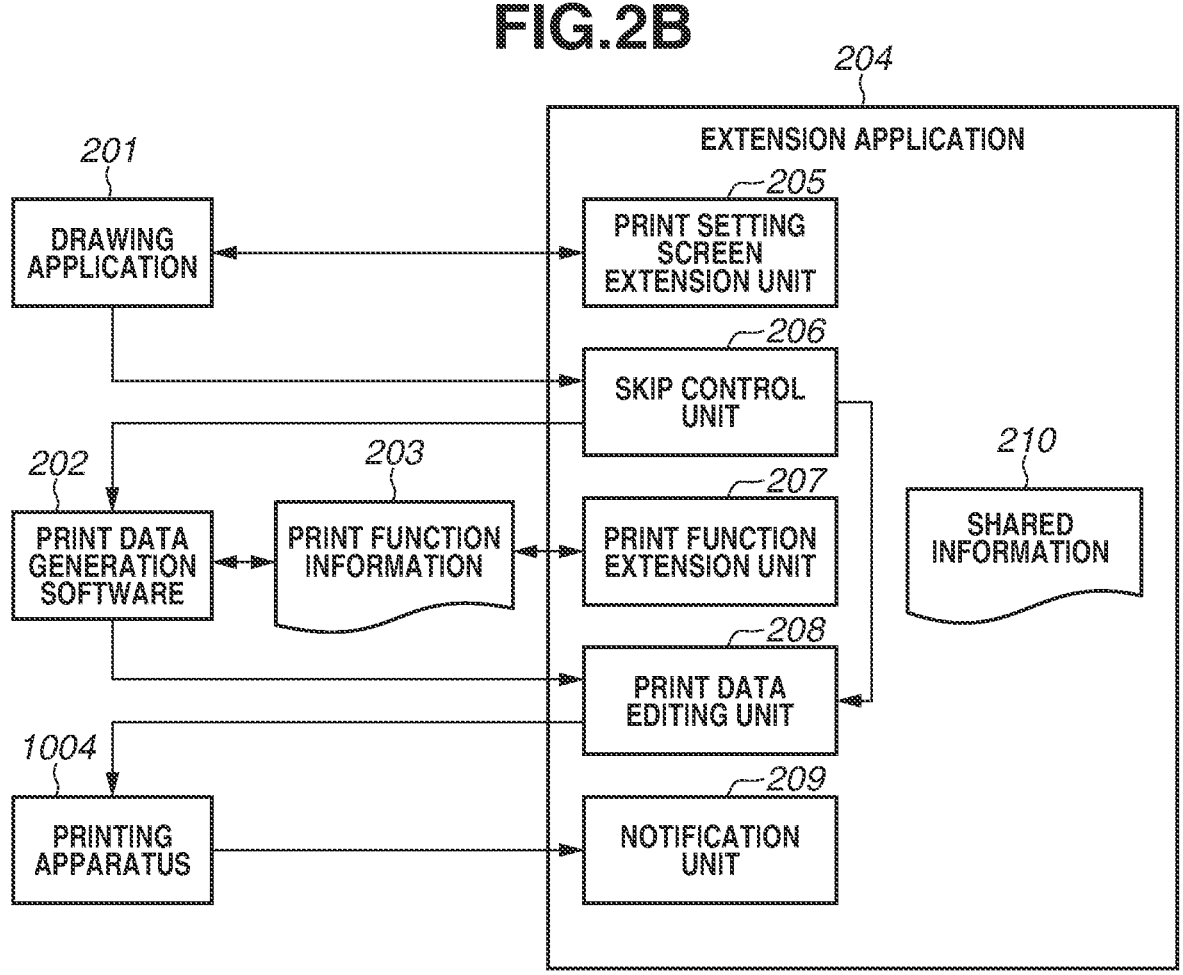

FIGS. 2A and 2B are diagrams schematically illustrating configurations of each piece of software of the host computer 101 and a printing system including the printing apparatus 1004. Here, a printing system using the host computer 101 equipped with Windows® 11 of Microsoft® as the OS is described as a premise. FIG. 2A is a diagram illustrating a general configuration in which the extension application 204 is not associated with the print data generation software 202 and the printing apparatus 1004.

A drawing application 201 is software for creating drawing data (image data) to be printed. For example, a document creation application or a spread sheet application is equivalent to the drawing application 201. Upon receiving a print request from the user, the drawing application 201 issues a print instruction to the OS. The print instruction includes print setting information for issuing instructions for operations of the print data generation software 202 and the printing apparatus 1004. The print setting information is also called PrintTicket (hereinafter referred to as "PT").

To output print setting information, the drawing application 201 is able to cause a print setting screen which any one of the print data generation software 202, the OS, and the drawing application 201 provides to be displayed. In the print setting screen, setting items indicating settable print functions and control items indicating setting values of the setting items are displayed according to capability information (information indicating functions which the printing apparatus 1004 is able to execute) which is acquired from the print data generation software 202. The capability information is also called PrintCapabilities (hereinafter referred to as "PC"). The print data generation software 202 determines PC based on print function information 203. The print function information 203 is data indicating print functions, in which all of the settable print functions, setting values of the print functions, and mutually exclusive relationships of the setting values are described. The print function information 203 is also called Print Device Capabilities (PDC). The print function information 203 is included in a configuration file of the print data generation software 202 and is arranged as an unmodifiable file in the external storage device 114. Alternatively, the print function information 203 can also be configured to be dynamically generated by the print data generation software 202. Specifically, the print data generation software 202 or the OS can be configured to acquire attribute data about the printing apparatus 1004 from the printing apparatus 1004 and then generate the print function information 203 according to attribute information included in the acquired attribute data. Furthermore, in a case where the print function information 203 is generated dynamically, the generated print function information 203 is able to be edited. Furthermore, the attribute data about the printing apparatus 1004, which is acquired from the printing apparatus 1004, is a response which the print data generation software 202 or the OS acquires by issuing a Get-Printer-Attributes operation of the Internet Print Protocol (IPP) to the printing apparatus 1004. The response includes attribute information indicating functions which the printing apparatus 1004 is able to execute (the capability of the printing apparatus 1004) and setting values related to the attribute information. The response is then stored in the RAM 113.

With the above-described configuration, the print data generation software 202 is able to be configured to allow the user to designate a print function which is able to be used by each printing apparatus 1004 depending on the connected printing apparatus. Thus, even in a case where a printing apparatus having a different function or a printing apparatus developed (provided) by a different vendor has been connected, the print data generation software 202 is able to be configured to allow the user to designate a print function which is able to be used depending on the connected printing apparatus. Furthermore, here, as the print data generation software 202, a configuration using IPP Class Driver or UP Class Driver included in Windows® 11 is described. Each of IPP Class Driver and UP Class Driver is a printer driver which performs print processing according to specifications of a standard print protocol called Internet Print Protocol (IPP), and is included in a package of the OS. Each of IPP Class Driver and UP Class Driver is not a specific printer driver corresponding to the model of the printing apparatus 1004 but a standard class driver which is able to be used in common by a plurality of printing apparatuses. IPP Class Driver is a standard driver which performs local printing according to the above-mentioned specifications, and UP Class Driver is a standard driver which performs cloud printing according to the above-mentioned specifications. The local printing is a configuration in which print data is directly transmitted to a printing apparatus without via a cloud service such as a cloud printing related service described below and is then printed. The cloud printing is a configuration in which print data is not directly transmitted to a printing apparatus but is transmitted to a printing apparatus via a cloud printing related service described below and is then printed. Moreover, each of IPP Class Driver and UP Class Driver acquires capability information about the connected printing apparatus 1004 in such a way as to enable the user to designate a print function which is supported by the connected printing apparatus, and then generates the print function information 203 based on the acquired capability information.

Furthermore, in a case where the extension application 204 is associated with IPP Class Driver, a configuration in which the host computer 101 and the printing apparatus 1004 are interconnected in such a way as to be able to communicate with each other (hereinafter referred to as a "direct communication configuration") is determined to be employed. Moreover, in a case where the extension application 204 is associated with UP Class Driver, a configuration in which the host computer 101 and the printing apparatus 1004 indirectly perform communication with each other via a cloud printing related service (hereinafter referred to as an "indirect communication configuration") is determined to be employed. Furthermore, a configuration in which the host computer 101 and the printing apparatus 1004 perform communication with each other via at least one cloud service out of cloud printing related services is also referred to as an "indirect communication configuration".

An example in which the host computer 101 and the printing apparatus 1004 take a direct communication configuration includes a case where the host computer 101 is directly connected to the printing apparatus 1004 via the input-output interface 116 with a physical cable such as a Universal Serial Bus (USB) cable. Alternatively, the host computer 101 and the printing apparatus 1004 can be interconnected on a local area network via the NETIF 120. Moreover, a connection to the local area network can be a wired connection or a wireless connection. In this case, the host computer 101 and the printing apparatus 1004 are able to perform communication with each other according to protocol specifications of the IPP.

On the other hand, in a case where the host computer 101 and the printing apparatus 1004 take an indirect communication configuration, the host computer 101 and the printing apparatus 1004 are not interconnected in such a way as to be able to communicate with each other.

The host computer 101 is able to communicate with a cloud printing related service via the Internet, and the printing apparatus 1004 is also able to communicate with a cloud printing related service via the Internet. Issuing a print instruction from the host computer 101 to the printing apparatus 1004 is performed via a cloud printing related service.

Here, processing in which print data is transmitted to the printing apparatus 1004 and is then printed thereby is described with reference to FIG. 2A. The OS generates intermediate data 302 (also referred to as "input data") based on a print instruction output from the drawing application 201, and then passes the intermediate data 302 to the print data generation software 202. Furthermore, data which the drawing application 201 outputs to be used for printing is data of the Graphics Device Interface format (GDI format data) or data of the XML Paper Specification format (XPS format data). In a case where an IPP Class Driver is used as the print data generation software 202, if data which the drawing application 201 outputs is data of the GDI format, the OS converts data of the GDI format output from the drawing application 201 into data of the XPS format. Then, the OS passes the data of the XPS format obtained by conversion as the intermediate data 302 to the print data generation software 202. If data which the drawing application 201 outputs is data of the XPS format, the OS passes the data of the XPS format as the intermediate data 302 to the print data generation software 202. Furthermore, the intermediate data 302 includes image data, which is information about a graphic to be formed on paper, and print setting information, which has been set by the user.

The print data generation software 202 converts the acquired intermediate data 302 into print data which the printing apparatus 1004 is able to interpret, and transmits the print data to the printing apparatus 1004. Furthermore, the print data includes drawing data, which is information about a graphic to be formed on paper, and print setting attribute information (attribute information for designating a print setting), which has been generated based on print setting information set by the user.

The print setting attribute information includes attribute information indicating a function (the capability of a printing apparatus) which the printing apparatus 1004 is able to execute and a setting value related to the attribute information.

The printing apparatus 1004 performs printing (print) on paper based on the print data transmitted from the print data generation software 202. At this time, the printing apparatus 1004 forms, on paper, drawing data included in the print data by performing an operation corresponding to print setting attribute information included in the print data. The print setting attribute information includes information about a print quality (such as image quality priority or speed priority), the size of drawing data, and a drawing position (margin).

FIG. 2B is a diagram illustrating a configuration in which the extension application 204 is associated with the print data generation software 202 and the printing apparatus 1004. Furthermore, constituent elements or processing operations which are not particularly mentioned in the following description are equivalent to those described with reference to FIG. 2A.

Upon receiving a print request from the user, the drawing application 201 issues a print instruction to the OS. Even in this configuration, as with the configuration illustrated in FIG. 2A, the drawing application 201 is able to cause a print setting screen to be displayed. In this configuration, a print setting screen which the extension application 204 provides is displayed. Specifically, a print setting screen which the print setting screen extension unit 205 included in the extension application 204 provides is displayed. Furthermore, whether a print setting screen which the print setting screen extension unit 205 provides is displayed depends on an operation of the user. Furthermore, as mentioned above, in the print setting screen, only setting items indicating settable print functions are displayed according to capability information acquired from the print data generation software 202.

This reduces a print setting which is not included in the capability information about a printing apparatus from being performed by the user.

Moreover, when the drawing application 201 receives a print request from the user and then issues a print instruction to the OS, the OS starts up the skip control unit 206. The skip control unit 206 performs control to determine whether to skip a processing operation of the print data generation software 202. After a skip control processing operation of the skip control unit 206, the OS generates intermediate data 302 based on the print instruction output from the drawing application 201, and then passes the intermediate data 302 to the print data generation software 202. Here, in a case where skip control is not performed by the skip control unit 206, the print data generation software 202 converts the intermediate data 302 into print data 303 which the printing apparatus 1004 is able to interpret, and passes the print data 303 to the print data editing unit 208. On the other hand, in a case where skip processing on the print data generation software 202 is performed, the intermediate data 302 is passed to the print data editing unit 208 without being processed by the print data generation software 202. This enables the intermediate data 302 to be processed by the print data editing unit 208.

The print data editing unit 208 performs editing of the intermediate data 302 passed from the print data generation software 202 or print data processed by the print data generation software 202. Taking, as an example, layout printing as the content of editing, the print data editing unit 208 changes the layout of the intermediate data 302 or print data based on print setting information about layout printing received from the OS. Moreover, the print data editing unit 208 is able to display a user interface (UI) screen on the display unit 119 and is thus able to display, as a preview screen, an image of a print result of the intermediate data 302 or print data. Furthermore, in the print data editing unit 208, when the screen remains opened, print data is not transmitted to the printing apparatus 1004, and, when the screen is closed, transmission processing of print data is performed.

After the print data editing unit 208 edits the intermediate data 302 or print data, the print data is transmitted to the printing apparatus 1004. The printing apparatus 1004 performs printing on paper based on the received print data.

Furthermore, a configuration in which, in a case where the print data generation software 202 has been skipped by the skip control unit 206, the print data editing unit 208 converts the received intermediate data 302 into print data which the printing apparatus 1004 is able to interpret can be employed. Moreover, to convert the intermediate data 302 into print data, a function which the OS provides can be used.

The extension application 204 includes a print function extension unit 207. The print function extension unit 207 is able to edit print function information 203 (PDC) which the print data generation software 202 or the OS has generated. This enables the print function extension unit 207 to perform, for example, addition of a function which the extension application 204 provides, addition of a function which the printing apparatus 1004 supports but the print data generation software 202 does not support, and addition of mutually exclusive relationships of setting values of the print function. The OS starts up the print function extension unit 207 when the extension application 204 has been associated with the printing apparatus 1004 and the print data generation software 202 for the first time. Additionally, the OS can start up the print function extension unit 207 at other timing, such as the time of starting up of the OS. With this configuration, in a case where, for example, an option device (for example, a finisher) is added later to the printing apparatus 1004 so that a function related to printing is extended, the print function extension unit 207 is able to detect and add the extended function to the print function information 203.

Moreover, the extension application 204 includes a notification unit 209. The notification unit 209 is able to display a notification (status notification) to the user in response to the occurrence of an error in the printing apparatus 1004. For example, when a running-out of paper error occurs in the printing apparatus 1004, the print data generation software 202 detects the running-out of paper error and the OS displays a message on the display unit 119 with use of a notification function called a toast notification, which is a function of the OS. When the user presses the toast notification, the notification unit 209 of the extension application 204 is invoked by the OS, so that a UI screen of the notification unit 209 is displayed. In the UI screen of the notification unit 209, for example, displaying of a detailed message for the running-out of paper error or a paper supplementing method can be performed.

Furthermore, the configuration of the extension application 204 for implementing the first exemplary embodiment is not limited to a configuration including all of the above-mentioned functions (units) but can be a configuration including only part of the functions or a configuration additionally including another function. Moreover, the extension application 204 may be simply called print software. As described above, the extension application 204 includes at least one of a function of displaying a setting screen (the print setting screen extension unit 205), a function of controlling whether to skip a processing operation of the print data generation software 202 (the skip control unit 206), a function of editing print data to be input to the printing apparatus 1004 (the print data editing unit 208), a function of extending a function which is able to be designated by the print data generation software 202 (the print function extension unit 207), and a function of displaying a screen in response to the occurrence of an error in the printing apparatus 1004 (the notification unit 209).

Moreover, the extension application 204 can be configured to end its operation every time a processing operation of each unit ends. In that case, the OS is configured to start up the extension application 204 every time a request for using each unit is received. Moreover, another configuration is conceivable. For example, while the OS ends an operation of the extension application 204 when a processing operation of the print setting screen extension unit 205 ends, the OS can be configured to remain the extension application 204 activated even if a processing operation of the skip control unit 206 ends.

Additionally, the extension application 204 can be configured to cancel processing during a processing operation of each unit. In a case where the extension application 204 has canceled processing, a print job which is being processed on a print queue is deleted by the OS. Furthermore, the print job includes print data.

Additionally, here, formats of print data in respective processing operations taken until the print data is transmitted to and printed by the printing apparatus 1004 are described.

The print data generation software 202 acquires capability information from the printing apparatus 1004 and determines a format of print data which the printing apparatus 1004 supports, thus, based on a result of such determination, becoming able to convert the intermediate data 302 into print data which the printing apparatus 1004 is able to interpret. Furthermore, in some cases, a portion which mentions a format of print data in the following description actually refers to a format of drawing data included in print data.

FIGS. 3A, 3B, and 3C are diagrams illustrating formats of data (data formats) which are handled by each processing operation of the printing system in the first exemplary embodiment. Furthermore, while, in FIGS. 3A to 3C illustrating data formats, a printing system in which the host computer 101 and the printing apparatus 1004 are interconnected in such a way as to be able to directly communicate with each other is illustrated as an example, the host computer 101 and the printing apparatus 1004 can be configured to be interconnected in such a way as to be able to indirectly communicate with each other via, for example, a cloud service. Furthermore, specifically, the host computer 101 and the printing apparatus 1004 can be configured to be interconnected in such a way as to be able to indirectly communicate with each other via a cloud printing related service described below. FIG. 3A is a diagram illustrating a data format which is handled by each processing operation of the printing system in a case where the extension application 204 is not associated. Upon receiving a print instruction from the drawing application 201, the OS generates XPS data 302, which is intermediate data. The print data generation software 202 converts the XPS data 302 into print data which the printing apparatus 1004 is able to interpret. Specifically, the print data generation software 202 determines formats of print data which the printing apparatus 1004 supports, based on attribute data acquired from the printing apparatus 1004, and then generates print data which the printing apparatus 1004 is able to interpret. The formats of print data can be, for example, Portable Document Format (PDF) and PWG Raster Format, but is not limited to these. In the first exemplary embodiment, PWG Raster Format is assumed to be used as a format of print data which the printing apparatus 1004 is able to interpret. Therefore, the print data generation software 202 converts the XPS data 302 into PWG Raster data 303 and transmits the PWG Raster data 303 to the printing apparatus 1004. Then, the printing apparatus 1004 performs printing based on the received PWG Raster data 303. Furthermore, the intermediate data 302 or print data 303 is also referred to "print data", which is data concerning printing.

FIG. 3B is a diagram illustrating a format of data which is handled by each processing operation of the printing system in a case where the extension application 204 is associated and a skip instruction for print data generation processing to be performed by the print data generation software 202 is not issued. When a print instruction from the drawing application 201 is received, the skip control unit 206 of the extension application 204 is invoked. However, in the configuration illustrated in FIG. 3B, the skip control unit 206 does not issue an instruction for skipping a processing operation of the print data generation software 202. With this configuration, as with the configuration illustrated in FIG. 3A, the print data generation software 202 converts the XPS data 302 into the PWG Raster data 303. The print data editing unit 208 receives the PWG Raster data 303 as input data. Since the PWG Raster data 303 is print data which the printing apparatus 1004 is able to interpret, the print data editing unit 208 directly transmits the PWG Raster data 303 serving as input data to the printing apparatus 1004. The printing apparatus 1004 performs printing based on the received PWG Raster data 303.

FIG. 3C is a diagram illustrating a format of data which is handled in a case where the extension application 204 is associated and a skip instruction for print data generation processing to be performed by the print data generation software 202 has been issued. When a print instruction from the drawing application 201 is received, the skip control unit 206 of the extension application 204 is invoked. The skip control unit 206 issues, to the OS or the print data generation software 202, an instruction not to perform conversion processing from the intermediate data 302 to print data. Upon receiving a skip instruction from the skip control unit 206, without converting the intermediate data 302 into print data, the print data generation software 202 passes the intermediate data 302 to the print data editing unit 208 of the extension application 204. The print data editing unit 208 performs necessary editing, such as layout change processing of print data, with respect to XPS data 302 based on print setting information, converts the XPS data 302 into PWG Raster data 303, and then transmits the PWG Raster data 303 to the printing apparatus 1004. The printing apparatus 1004 performs printing based on the received data. However, in a case where XPS data is included in a format of print data which the printing apparatus 1004 is able to interpret, the print data editing unit 208 can be configured to, without converting XPS data into a different format, transmit the XPS data to the printing apparatus 1004 to perform printing.

Furthermore, in the first exemplary embodiment, XPS data not yet converted is assumed to be referred to as "intermediate data 302" or "pre-conversion data 302", and data converted into PWG Raster data 303 is assumed to be referred to as "print data 303" or "post-conversion data 303".

Figure 4:
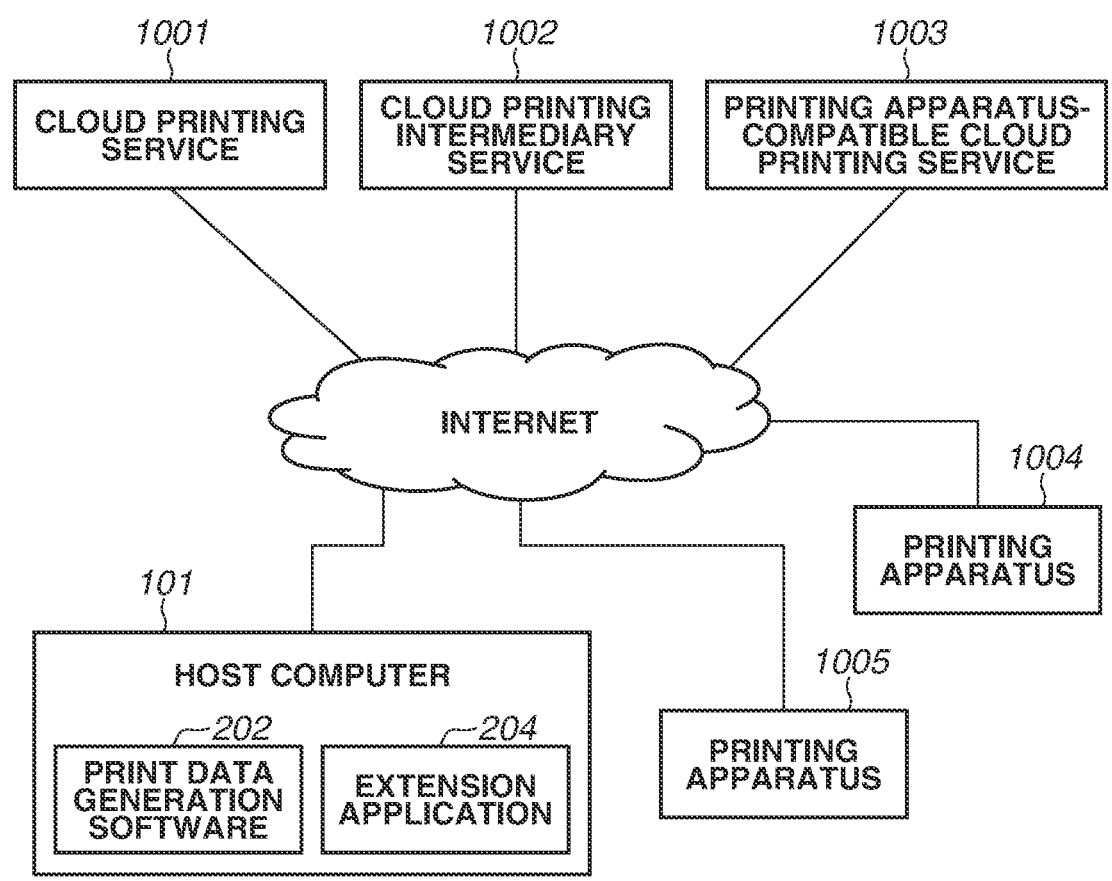
FIG. 4 is a diagram illustrating a configuration of printing which is performed by the printing system.

Next, a configuration of the printing system in the indirect communication configuration is described with reference to FIG. 4. FIG. 4 is a schematic diagram illustrating an example of the printing system in the first exemplary embodiment. The host computer 101 and the printing apparatuses 1004 and 1005 are connected to the Internet. A cloud printing service 1001, with which each of the printing apparatuses 1004 and 1005 is not compatible, a cloud printing intermediary service 1002, and a cloud printing service 1003 (hereinafter also referred to as a "printing apparatus-compatible cloud printing service 1003"), with which each of the printing apparatuses 1004 and 1005 is compatible, are similarly connected to the Internet. In the first exemplary embodiment, the cloud printing service 1001, the cloud printing intermediary service 1002, and the printing apparatus-compatible cloud printing service 1003 are collectively referred to as a "cloud printing related service". Furthermore, each service included in the cloud printing related service is a cloud server (server).

In a case where login to the cloud printing service 1001 has been performed by the user on the host computer 101, the host computer 101 is able to transmit print data to the cloud printing service 1001. The driver which is used at the time of transmission of print data from the host computer 101 to the cloud printing service 1001 is a UP Class Driver, which is one piece of software included in the print data generation software 202, which the OS provides. The user issues a print instruction with use of the UP Class Driver, thus being able to perform print processing via Universal Print, which is one service included in the cloud printing service 1001.

Moreover, the printing apparatus-compatible cloud printing service 1003 is a cloud service which provides a print service on the Internet, on which each of the printing apparatuses 1004 and 1005 performs communication. Transmitting print data to the printing apparatus-compatible cloud printing service 1003 associated with the printing apparatuses 1004 and 1005 enables causing the printing apparatus 1004 or 1005 to perform print processing.

The cloud printing intermediary service 1002 is able to serve as an intermediary for print data between the cloud printing service 1001 and the printing apparatus-compatible cloud printing service 1003. Specifically, based on print data having being transmitted from the host computer 101 to a logical printing apparatus of the cloud printing service 1001, the cloud printing intermediary service 1002 converts the print data transmitted to the logical printing apparatus of the cloud printing service 1001 into a format compatible with the printing apparatus-compatible cloud printing service 1003. Then, the cloud printing intermediary service 1002 transmits the converted print data to the printing apparatus-compatible cloud printing service 1003, and the printing apparatus-compatible cloud printing service 1003 then transmits the print data to the printing apparatus 1004 or 1005, thus being able to cause the printing apparatus 1004 or 1005 to perform print processing.

The host computer 101 and the cloud printing intermediary service 1002 are able to communicate with the cloud printing service 1001 via the Internet. Then, the printing apparatuses 1004 and 1005 and the cloud printing intermediary service 1002 are able to communicate with the printing apparatus-compatible cloud printing service 1003 via the Internet. The host computer 101 and the printing apparatuses 1004 and 1005 do not directly communicate with each other, but perform communication via the cloud printing related service. Specifically, the host computer 101 transmits print data to the cloud printing service 1001, and the cloud printing service 1001 transmits the print data to the cloud printing intermediary service 1002. Then, the cloud printing intermediary service 1002 transmits the print data to the printing apparatus-compatible cloud printing service 1003, and the printing apparatus-compatible cloud printing service 1003 transmits the print data to the printing apparatus 1004 or 1005, so that print processing is performed by the printing apparatus 1004 or 1005.

Furthermore, as an example in the first exemplary embodiment, the cloud printing service 1001 is assumed to be Universal Print, which Microsoft Corporation provides, but can be a cloud printing service which other than Microsoft Corporation provides. Moreover, the cloud printing intermediary service 1002 or the printing apparatus-compatible cloud printing service 1003 is a cloud service which is provided by a vendor which provides (manufactures) the printing apparatuses 1004 and 1005. While the printing apparatuses 1004 and 1005 in the first exemplary embodiment are not compatible with the cloud printing service 1001, since print data transmitted from the host computer 101 is transmitted by the cloud printing intermediary service 1002 to the printing apparatus 1004 or 1005 via the cloud printing service 1001, print processing is performed.

Furthermore, the printing system in the first exemplary embodiment is not limited to the above-described one, but only needs to be a system in which the host computer 101, the cloud printing service 1001, the printing apparatus-compatible cloud printing service 1003, the cloud printing intermediary service 1002, and the printing apparatuses 1004 and 1005 are interconnected via the Internet in such a way as to be able to communicate with each other. Moreover, the communication format in the network can be wireless communication or wired communication. Additionally, the cloud printing intermediary service 1002 and the printing apparatus-compatible cloud printing service 1003 can be integrated into a single cloud service. Moreover, the printing apparatuses 1004 and 1005 in the first exemplary embodiment are not compatible with the cloud printing service 1001, but can be configured to be compatible with the cloud printing service 1001.

Furthermore, in some cases, the printing apparatus-compatible cloud printing service 1003, which is used in a case where the printing configuration is an indirect communication configuration, may have restriction information concerning printing (hereinafter referred to as "print restriction information").

Thus, print restriction information (hereinafter also referred to as "restriction information") may exist in a printing system using the printing apparatus-compatible cloud printing service 1003 (thus, the above-mentioned indirect communication configuration). The print restriction information is information which is set in the printing apparatus-compatible cloud printing service 1003, and is information indicating that, in a case where information concerning print data satisfies a predetermined condition that is based on predetermined restriction information concerning print data, an error in which control for performing print processing is not performed occurs.

When having received print data, the printing apparatus-compatible cloud printing service 1003 performs restriction determination to determine whether information concerning the print data satisfies a predetermined condition that is based on predetermined print restriction information. When, in the restriction determination, having determined that information concerning the print data satisfies a predetermined condition that is based on predetermined print restriction information, the printing apparatus-compatible cloud printing service 1003 performs processing for performing notification concerning an error in which print processing is not performed. Specifically, the printing apparatus-compatible cloud printing service 1003 transmits, to the cloud printing intermediary service 1002, information concerning an error in which print processing is not performed, and does not transmit the print data to the printing apparatus 1004 or 1005. Then, the cloud printing intermediary service 1002 transmits the received information concerning an error to the cloud printing service 1001. Then, the cloud printing service 1001 issues, on the cloud printing service 1001, an error notification indicating that an error in which print processing is not performed occurs, based on the received information concerning an error. Moreover, when, in the restriction determination, having determined that information concerning the print data does not satisfy a predetermined condition that is based on predetermined print restriction information, the printing apparatus-compatible cloud printing service 1003 transmits the print data to the printing apparatus 1004 or 1005.

The predetermined print restriction information is, for example, a predetermined limit value concerning print data which is used in the restriction determination, and is a value indicating that an error in which control for performing print processing is not performed occurs. Moreover, the predetermined condition is a condition indicating that an error in which print processing of print data is not performed occurs. Thus, in a case where it is determined that a predetermined value concerning print data exceeds a predetermined limit value concerning print data, it is determined that information concerning the print data satisfies a predetermined condition that is based on the predetermined print restriction information. For example, the predetermined value concerning print data or the predetermined limit value concerning print data is a value indicating the number of pages or value of the data size, but can be another type of value. Furthermore, the predetermined print restriction information does not need to be a predetermined limit value concerning print data, but only needs to be predetermined restriction information concerning print data.

Moreover, in a case where the printing apparatus-compatible cloud printing service 1003 has print restriction information, the cloud printing intermediary service 1002 can have print restriction information. In this case, when having received print data, the cloud printing intermediary service 1002 performs restriction determination to determine whether information concerning print data satisfies a predetermined condition that is based on predetermined print restriction information. When, in the restriction determination, having determined that information concerning print data satisfies a predetermined condition that is based on predetermined print restriction information, the cloud printing intermediary service 1002 transmits information concerning an error in which print processing is not performed to the cloud printing service 1001, and does not transmit the print data to the printing apparatus-compatible cloud printing service 1003. Then, an error notification indicating that an error in which print processing is not performed occurs is issued on the cloud printing service 1001 based on the received information concerning an error. Moreover, when, in the restriction determination, having determined that information concerning print data does not satisfy a predetermined condition that is based on predetermined print restriction information, the cloud printing intermediary service 1002 transmits the print data to the printing apparatus-compatible cloud printing service 1003. Then, the print data is transmitted to the printing apparatus 1004 or 1005 by the printing apparatus-compatible cloud printing service 1003. Furthermore, in a case where the printing apparatus-compatible cloud printing service 1003 has print restriction information, the cloud printing intermediary service 1002 does not need to have print restriction information.

Moreover, in a case where an error notification is issued on the cloud printing service 1001, the user logs in to the cloud printing service 1001, thus being able to recognize the error notification displayed on the cloud printing service 1001.

However, in the above-mentioned configuration, since the user becomes recognizing the occurrence of an error after print data is already transmitted from the extension application 204, it may take time until the user recognizes the occurrence of an error. Additionally, since the user is able to recognize an error notification only when having logged in to the cloud printing service 1001, usability may decrease.

Therefore, in the first exemplary embodiment, before transmitting print data to the cloud printing service 1001, the extension application 204 acquires print restriction information included in the cloud printing intermediary service 1002 or the printing apparatus-compatible cloud printing service 1003, and determines whether information concerning print data satisfies a predetermined condition that is based on the print restriction information. Then, in a case where information concerning print data satisfies a predetermined condition that is based on the print restriction information, the extension application 204 performs processing for issuing a notification for error occurrence to the user, and does not perform transmission of print data to the cloud printing service 1001. Moreover, in a case where the value concerning print data does not satisfy the print restriction information, the extension application 204 transmits print data to the cloud printing service 1001. This enables reducing a situation in which it may take time until the user recognizes the occurrence of an error. Additionally, since the user is able to recognize an error notification without logging in to the cloud printing service 1001, usability increases.

Furthermore, processing for issuing a notification for error occurrence which is performed by the extension application 204 can be processing in which, without an error notification being issued by the extension application 204, the extension application 204 causes another program capable of performing notification processing in the information processing apparatus to issue an error notification.

Figure 5:
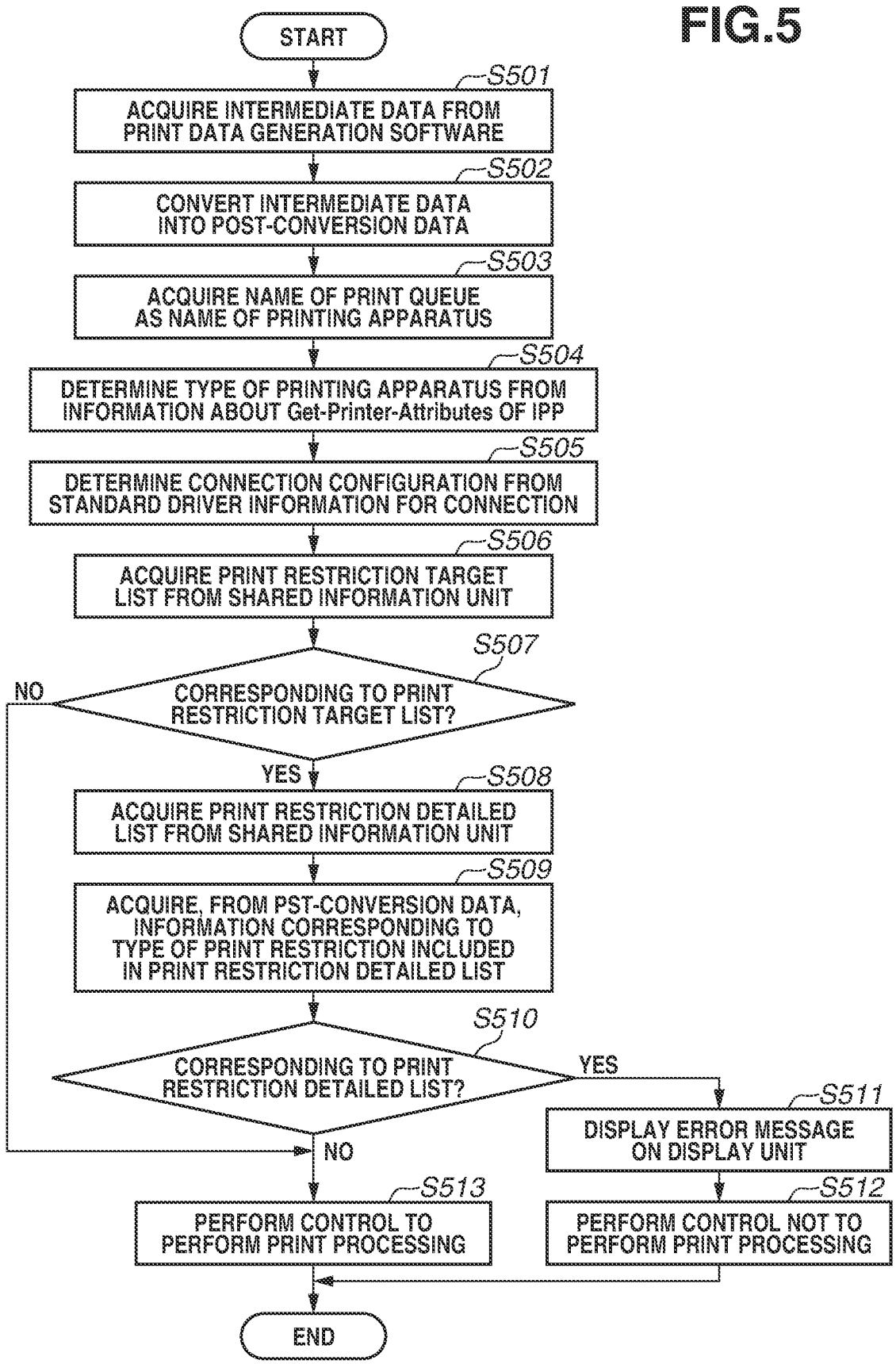
FIG. 5 is a flowchart of processing which is performed by a print data editing unit in a first exemplary embodiment.

FIG. 5 is a flowchart illustrating processing which is performed by the print data editing unit 208 of the extension application 204 in the present printing system. The processing in the present flowchart is started when, in response to a print instruction being issued by the user, the intermediate data 302 has been transmitted from the print data generation software 202. While, in the following description, the print data editing unit 208 of the extension application 204 may be assumed to be a subject for performing each processing operation, actually, a corresponding program is executed by the CPU 111 to implement a corresponding function.

In step S501, the print data editing unit 208 acquires the intermediate data 302 from the print data generation software 202. Furthermore, in the first exemplary embodiment, the intermediate data 302 is assumed to be acquired in the above-mentioned configuration illustrated in FIG. 3C, and the intermediate data 302 to be acquired is assumed to be XPS data. However, the print data 303 can be acquired in the above-mentioned configuration illustrated in FIG. 3B, and the print data 303 to be acquired can be PWG Raster data.

In step S502, the print data editing unit 208 converts the acquired intermediate data 302 into the post-conversion data 303, the format of which the printing apparatus 1004 is able to interpret. Here, the post-conversion data 303 is PWG Raster data. Furthermore, in step S502, the print data editing unit 208 performs editing processing, such as layout change processing, on the intermediate data 302 based on print setting information included in a print instruction.

In step S503, the print data editing unit 208 inquires of the OS about name information about a print queue with which the extension application 204 is associated, with use of an application programming interface (API), thus acquiring the name information as information concerning the name of a printing apparatus. Alternatively, the print data editing unit 208 can issue a Get-Printer-Attributes operation of the IPP to the printing apparatus 1004 and acquire information concerning the name of the printing apparatus 1004 obtained as reply information. For example, the print data editing unit 208 acquires "Printer A" as information about the name of a printing apparatus. Furthermore, in step S503, the print data editing unit 208 can issue a Get-Printer-Attributes operation of the IPP described below in step S504 to the printing apparatus 1004 and acquire information concerning the name of a printing apparatus.

In step S504, the print data editing unit 208 identifies the type of a printing apparatus by issuing a Get-Printer-Attributes operation of the IPP to the printing apparatus 1004 and acquiring information concerning the name of a printing apparatus. For example, suppose that the print data editing unit 208 has acquired information indicating that consumables are ink, as reply information to the Get-Printer-Attributes operation. In this case, based on information about consumables, the print data editing unit 208 determines that the type of a printing apparatus "printer A" is an inkjet type printer. Furthermore, examples of the type of a printing apparatus to be identified include an inkjet type printer and a laser beam type printer. Moreover, examples of the type of a printing apparatus include a multifunction printer (MFP), which has, for example, a scanner function and a facsimile (FAX) function, and a single function printer (SFP), which has only a printing function. Furthermore, from among inkjet type or laser beam type printers, whether the printing apparatus is a printer directed to general consumers or office uses or a printer directed to professional use cases typified by, for example, large format printing for use in drawing or advertising can be determined.

In step S505, the print data editing unit 208 determines a connection configuration in print processing. Thus, the print data editing unit 208 determines whether the print data generation software 202 with which the extension application 204 is associated is IPP Class Driver or UP Class Driver. The present processing is specifically described. First, when having issued a Get-Printer-Attributes operation of the IPP to the printing apparatus 1004 in step S504, the print data editing unit 208 acquires a device ID of the printing apparatus 1004. The device ID has, appended thereto, information (for example, information indicating a prefix) indicating whether the print data generation software 202 with which the extension application 204 is associated is IPP Class Driver or UP Class Driver. Therefore, the print data editing unit 208 refers to, for example, a prefix of the device ID and thus determines whether the print data generation software 202 with which the extension application 204 is associated is IPP Class Driver or UP Class Driver. Furthermore, in a case where the extension application 204 is associated with IPP Class Driver, the print data editing unit 208 determines that the connection configuration is a direct communication configuration. Moreover, in a case where the extension application 204 is associated with UP Class Driver, the print data editing unit 208 determines that the connection configuration is an indirect communication configuration. Furthermore, whether the print data generation software 202 with which the extension application 204 is associated is IPP Class Driver or UP Class Driver can be determined at timing when the extension application 204 has been associated with Class Driver and be then stored. In this case, in step S505, the print data editing unit 208 can acquire, from a storage unit such as a RAM, information indicating whether Class Driver with which the extension application 204 is associated is IPP Class Driver or UP Class Driver. Moreover, whether the print data generation software 202 with which the extension application 204 is associated is IPP Class Driver or UP Class Driver can be determined at timing when the extension application 204 has been activated for the first time after being associated with Class Driver and be then stored.

In step S506, the print data editing unit 208 acquires, from the shared information 210, a list in which information concerning print restriction is stored (hereinafter also referred to as a "print restriction target list"). The print restriction target list is a list in which information indicating whether a print restriction exists in a predetermined printing system, based on at least one piece of information out of information concerning the name of a printing apparatus, information concerning the type of a printing apparatus, and information concerning the connection configuration of a printing apparatus, is stored. Furthermore, the information which is being stored can be information indicating whether a print restriction exists based on a combination of some pieces of information out of information concerning the name of a printing apparatus, information concerning the type of a printing apparatus, and information concerning the connection configuration of a printing apparatus. The print restriction target list is assumed to be preliminarily stored in the shared information 210 based on print restriction information about the cloud printing intermediary service 1002 or the printing apparatus-compatible cloud printing service 1003, which, when the extension application 204 has been generated by a vendor, is provided by the same vendor. Here, the print restriction target list is described in detail with reference to FIG. 6.

FIG. 6 illustrates an example of the print restriction target list, in which information indicating whether a print restriction exists in a case where information concerning the type of a printing apparatus and information concerning the connection configuration are combined with each other is stored. For example, the print restriction target list indicates that, in a case where the type of a printing apparatus is an inkjet printer and the connection configuration is an indirect communication configuration, a print restriction exists. Moreover, the print restriction target list indicates that, in a case where the type of a printing apparatus is a laser beam printer and the connection configuration is an indirect communication configuration, any print restriction does not exist.

The description refers back to FIG. 5. In step S507, the print data editing unit 208 determines whether the printing system including the extension application 204 corresponds to a printing system in which the print restriction information exits. Specifically, the print data editing unit 208 refers to the print restriction target list acquired in step S506, and determines whether the printing system including the extension application 204 corresponds to a printing system in which the print restriction information exits, based on information concerning the name of a printing apparatus acquired in step S503, information concerning the type of a printing apparatus acquired in step S504, information concerning the connection configuration of a printing apparatus acquired in step S505, and a combination of some of such pieces of information. Thus, the print data editing unit 208 determines whether the printing system including the extension application 204 is a printing system including the printing apparatus-compatible cloud printing service 1003.

Furthermore, for example, the present determination includes a determination (identification) as to whether the type of a printing apparatus determined in step S504 is an inkjet printer or a laser beam printer. More specifically, for example, in a case where the print restriction target list is the one illustrated in FIG. 6, it is determined that the type of a printing apparatus is an inkjet printer in step S504, and it is determined that the connection configuration is an indirect communication configuration in step S505, the print data editing unit 208 determines that the printing system including the extension application 204 corresponds to a printing system in which the print restriction information exits. Moreover, for example, in a case where the print restriction target list is the one illustrated in FIG. 6, it is determined that the type of a printing apparatus is a laser beam printer in step S504, and it is determined that the connection configuration is an indirect communication configuration in step S505, the print data editing unit 208 determines that the printing system including the extension application 204 does not correspond to a printing system in which the print restriction information exits. Here, in a case where the type of a printing apparatus is a laser beam printer, at the time of cloud printing, in some cases, the host computer 101 and the printing apparatus 1004 or 1005 perform communication with each other via only the cloud printing service 1001 without via the cloud printing intermediary service 1002 or the printing apparatus-compatible cloud printing service 1003. Therefore, in a case where it is determined that the type of a printing apparatus is a laser beam printer in step S504 and it is determined that the connection configuration is an indirect communication configuration in step S505, the print data editing unit 208 determines that the printing system including the extension application 204 does not correspond to a printing system in which the print restriction information exits. Additionally, in a case where the connection configuration is a direct communication configuration, since the printing system including the extension application 204 is not a printing system including the printing apparatus-compatible cloud printing service 1003, the print data editing unit 208 determines that the printing system including the extension application 204 is a printing system in which the print restriction information does not exit (NO in step S507). If the result of determination in step S507 is yes (YES in step S507), the print data editing unit 208 advances the processing to step S508, and, if the result of determination in step S507 is no (NO in step S507), the print data editing unit 208 advances the processing to step S513.

In step S508, the print data editing unit 208 acquires, from the shared information 210, a list in which values of the print restriction information are stored (hereinafter also referred to as a "print restriction detailed list"). The print restriction detailed list has, stored therein, predetermined restriction information concerning print data. For example, as the predetermined restriction information, predetermined limit values concerning print data are stored. Examples of specific predetermined limit values include the number of pages available for printing, the data size available for printing, and the data format available for printing. Furthermore, the data size available for printing can be in units of job or can be in units of page. The print restriction detailed list is described in detail with reference to FIG. 7. In the print restriction detailed list illustrated in FIG. 7, the number of pages (page count) available for printing is stored as a predetermined limit value, which indicates that the number of pages available for printing is 100 pages. Moreover, the data size available for printing is stored as a predetermined limit value, which indicates that the data size available for printing is 100 megabytes (MB). Furthermore, while, in the print restriction target list illustrated in FIG. 6, "YES" or "NO" is set forth in the column of "Existence of Restriction", a limit value can be written in the column of "Existence of Restriction", and, in this case, the print data editing unit 208 does not need to acquire the print restriction detailed list from the shared information 210 in step S508.

In step S509, the print data editing unit 208 acquires, from the above-mentioned post-conversion data 303, information corresponding to the predetermined restriction information and concerning print data included in the post-conversion data 303. For example, in a case where the print restriction detailed list is the one illustrated in FIG. 7, the print data editing unit 208 acquires respective values of pieces of information concerning the number of pages and the data size of the post-conversion data 303. Furthermore, the print data editing unit 208 can acquire, instead of the post-conversion data 303, information concerning print data from the intermediate data 302.

In step S510, the print data editing unit 208 determines whether the information corresponding to the predetermined restriction information and concerning print data included in the post-conversion data 303 exceeds predetermined restriction information stored in the print restriction detailed list. For example, in a case where the print restriction detailed list is the one illustrated in FIG. 7, the print data editing unit 208 determines whether the number of pages of the post-conversion data 303 exceeds 100 pages (is greater than or equal to 101 pages). Moreover, the print data editing unit 208 determines whether the data size of the post-conversion data 303 exceeds 100 MB. If the result of determination in step S510 is yes (YES in step S510), the print data editing unit 208 advances the processing to step S511, and, if the result of determination in step S510 is no (NO in step S510), the print data editing unit 208 advances the processing to step S513. Furthermore, in a case where, in the print restriction detailed list, there is a plurality of pieces of information corresponding to the predetermined restriction information and concerning print data included in the post-conversion data 303, if at least one of pieces of information corresponding to the predetermined restriction information and concerning print data included in the post-conversion data 303 exceeds predetermined restriction information stored in the print restriction detailed list, the result of determination in step S510 becomes yes (YES in step S510).

Figure 8A:
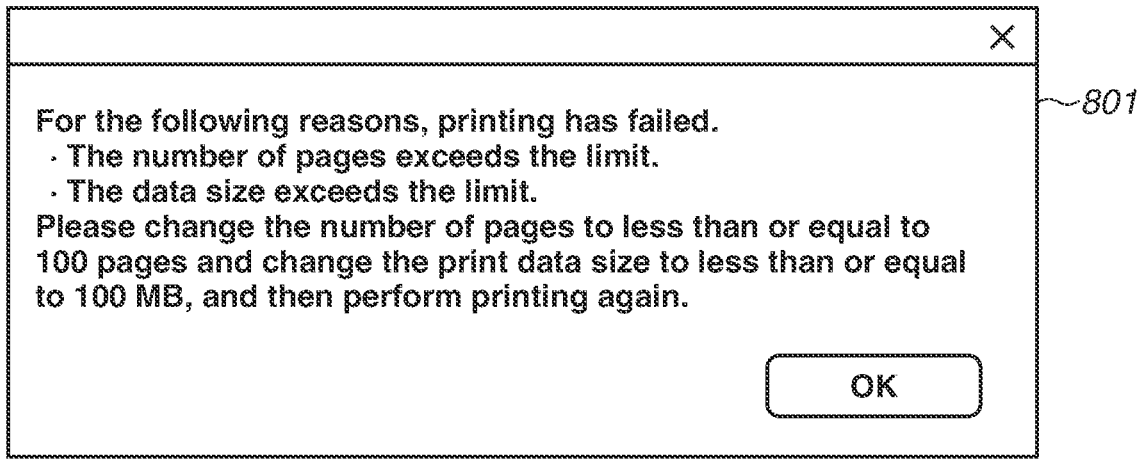
FIGS. 8A, 8B, and 8C are diagrams each illustrating an example of an error message.
Figure 8B:
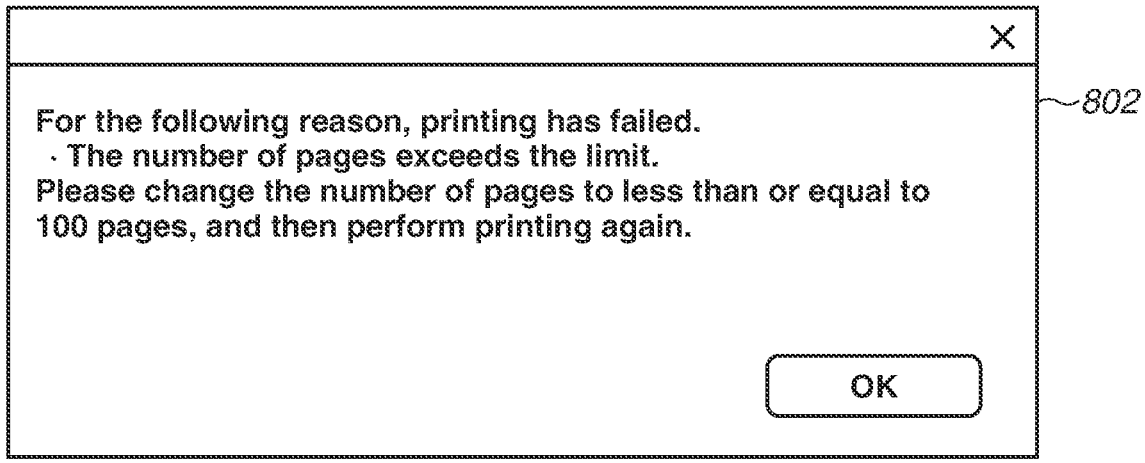
Figure 8C:
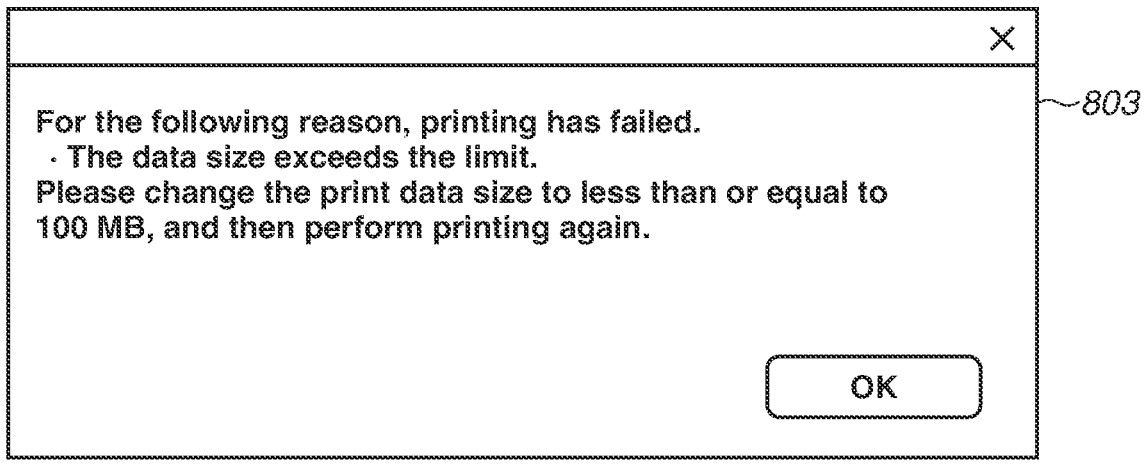

In step S511, the print data editing unit 208 outputs (displays), via the display unit 119, a notification indicating that an error has occurred (hereinafter also referred to as an "error notification"). Each of FIGS. 8A, 8B, and 8C illustrates an example of an error notification which the print data editing unit 208 displays on the display unit 119. In a notification screen illustrated in each of FIGS. 8A to 8C, the content indicating that printing has failed and information indicating the reason why printing has failed are displayed. For example, in a case where the print restriction detailed list is the one illustrated in FIG. 7, the number of pages of the post-conversion data 303 exceeds 100 pages, and the data size exceeds 100 MB, a notification screen 801 is displayed.

Moreover, in a case where the print restriction detailed list is the one illustrated in FIG. 7, the number of pages of the post-conversion data 303 exceeds 100 pages, and the data size does not exceed 100 MB, a notification screen 802 is displayed. Additionally, in a case where the print restriction detailed list is the one illustrated in FIG. 7, the number of pages of the post-conversion data 303 does not exceed 100 pages, and the data size exceeds 100 MB, a notification screen 803 is displayed. Thus, the content of a notification can be changed according to the reason why printing has failed. Moreover, while a configuration in which the reason why printing has failed is displayed is illustrated, since, actually, in step S511, the post-conversion data 303 is still not transmitted to the cloud printing service 1001, information indicating that it is not impossible to transmit print data can be displayed in the notification screen. Furthermore, while, in the first exemplary embodiment, it is supposed that an error notification is displayed by the display unit 119 included in the host computer 101, for example, an error notification can be displayed by a display unit included in the printing apparatus 1004 in response to the print data editing unit 208 transmitting, to the printing apparatus 1004, a command indicating that the printing apparatus 1004 is subjected to print restriction. Moreover, in response to the print data editing unit 208 transmitting an instruction command to cause a program other than the extension application 204 in the host computer 101 to issue an error notification, an error notification can be issued by the program. Moreover, while, in each of FIGS. 8A to 8C, the content indicating that printing has failed and the reason why printing has failed are displayed in the notification screen, other pieces of information, such as the name of a print job in which printing has failed, the name of a printing apparatus in which printing has failed, the type of a printing apparatus, and a connection configuration, can also be displayed, and at least one piece of information out of the above-mentioned pieces of information can be displayed. Moreover, outputting of a notification indicating that printing has failed does not need to be performed via the display unit 119, but can be performed via, for example, an audio unit in a case where the host computer 101 includes the audio unit.

The description refers back to FIG. 5. In step S512, in response to an OK button in the notification screen illustrated in any one of FIGS. 8A to 8C being pressed, the print data editing unit 208 performs control for preventing print processing of the post-conversion data 303 from being performed. Specifically, the print data editing unit 208 performs control not to transmit the post-conversion data 303 to the designated printing apparatus 1004 or 1005 or the cloud printing service 1001, and then ends the processing in the present flowchart. Furthermore, in some cases, control not to transmit the post-conversion data 303 to the designated printing apparatus 1004 or 1005 in a case where the connection configuration is a direct communication configuration may be performed. Moreover, in some cases, control not to transmit the post-conversion data 303 to the cloud printing service 1001 in a case where the connection configuration is an indirect communication configuration may be performed.

In step S513, which follows the case of NO in step S507 or the case of NO in step S510, the print data editing unit 208 performs control for causing print processing of the post-conversion data 303 to be performed. Specifically, the print data editing unit 208 performs control to transmit the post-conversion data 303 to the designated printing apparatus 1004 or 1005 or the cloud printing service 1001, and then ends the processing in the present flowchart. For example, in a case where the type of a printing apparatus is a laser beam printer and the connection configuration is an indirect communication configuration, the print data editing unit 208 transmits the post-conversion data 303 to the cloud printing service 1001. After that, the post-conversion data 303 is transmitted from the cloud printing service 1001 to the printing apparatus 1004 or 1005. Moreover, for example, in a case where the type of a printing apparatus is an inkjet printer, the connection configuration is an indirect communication configuration, and the predetermined value concerning print data does not exceed a predetermined limit value, the print data editing unit 208 transmits the post-conversion data 303 to the cloud printing service 1001. After that, the post-conversion data 303 is transmitted from the cloud printing service 1001 to the printing apparatus 1004 or 1005 via the cloud printing intermediary service 1002 or the printing apparatus-compatible cloud printing service 1003. Furthermore, in some cases, control to transmit the post-conversion data 303 to the designated printing apparatus 1004 or 1005 in a case where the connection configuration is a direct communication configuration may be performed. Moreover, in some cases, control to transmit the post-conversion data 303 to the cloud printing service 1001 in a case where the connection configuration is an indirect communication configuration may be performed.

In the above-described exemplary embodiment, before transmitting print data to the cloud printing service 1001, the extension application 204 acquires information concerning a print restriction and determines whether information concerning print data satisfies a predetermined condition that is based on print restriction information. Then, in a case where the information concerning print data satisfies the predetermined condition that is based on print restriction information, the extension application 204 issues a notification for error occurrence to the user and interrupts the transmitting of print data to the cloud printing service 1001. Moreover, in a case where the information concerning print data does not satisfy the predetermined condition that is based on print restriction information, the extension application 204 transmits print data to the cloud printing service 1001. This enables reducing a situation in which it may take time until the user recognizes the occurrence of an error. Additionally, since the user is able to recognize an error notification without logging in to the cloud printing service 1001, usability increases.

In the above-described exemplary embodiment, the print data editing unit 208 acquires a print restriction target list or a print restriction detailed list from the shared information 210 included in the extension application 204. However, a configuration in which, outside the host computer 101, a server which preliminarily stores a print restriction target list and a print restriction detailed list and which is different from a cloud printing related service is arranged and the print data editing unit 208 acquires the print restriction target list and the print restriction detailed list by inquiring of the server can be employed. Furthermore, in this case, the present server is connected to the Internet and is thus able to communicate with the host computer 101. This enables reducing the trouble of performing updating of the extension application 204 in a case where the print restriction target list and the print restriction detailed list have been updated. Furthermore, in a case where a print restriction target list and a print restriction detailed list have been acquired from an external server, the print restriction target list and the print restriction detailed list can be then stored in the shared information 210, and, in this case, at next and subsequent times, the print restriction target list and the print restriction detailed list can be acquired from the shared information 210.

In the above-described first exemplary embodiment, the print data editing unit 208 acquires a print restriction detailed list from the shared information 210 included in the extension application 204 or from an external server. In this exemplary embodiment, for example, in a case where a print restriction provided in the cloud printing intermediary service 1002 or the printing apparatus-compatible cloud printing service 1003 has been updated, it is necessary to also update a print restriction detailed list provided in the extension application 204 or an external server along with updating of the print restriction. However, during a process in which updating of the print restriction detailed list is being performed, a time lag occurs until the values of the print restriction detailed list become identical to values of a print restriction provided in the cloud printing intermediary service 1002 or the printing apparatus-compatible cloud printing service 1003, so that a time may arise when the values of a print restriction set forth in the print restriction detailed list and the actual values of a print restriction provided in the cloud printing intermediary service 1002 or the printing apparatus-compatible cloud printing service 1003 are different from each other. Moreover, updating of the print restriction detailed list is troublesome. Therefore, in a second exemplary embodiment, according to a connection configuration in print processing, the print data editing unit 208 switches between acquiring a print restriction detailed list from the shared information 210 and acquiring a print restriction detailed list from the cloud printing intermediary service 1002 or the printing apparatus-compatible cloud printing service 1003. Specifically, in a case where the connection configuration is a direct communication configuration, the print data editing unit 208 acquires a print restriction detailed list from the shared information 210, and, in a case where the connection configuration is an indirect communication configuration, the print data editing unit 208 acquires a print restriction detailed list from a cloud printing related service. Furthermore, the print restriction detailed list can be acquired from the cloud printing intermediary service 1002 or can be acquired from the printing apparatus-compatible cloud printing service 1003 out of the cloud printing related service. In the second exemplary embodiment, constituent elements which are not particularly mentioned in the following description are those which perform processing operations similar to those in the first exemplary embodiment, and are, therefore, omitted from description.

FIG. 9 is a flowchart illustrating processing which is performed by the print data editing unit 208 of the extension application 204 in the present printing system. The processing in the present flowchart is started when, in response to a print instruction being issued by the user, the intermediate data 302 has been transmitted from the print data generation software 202. While, in the following description, the print data editing unit 208 of the extension application 204 may be assumed to be a subject for performing each processing operation, actually, a corresponding program is executed by the CPU 111 to implement a corresponding function.

Processing operations in steps S901 to S906 are processing operations similar to those in steps S501 to S506 illustrated in FIG. 5, and are, therefore, omitted from description.

In step S907, the print data editing unit 208 refers to the print restriction target list acquired in step S906 in print processing, and, based on information concerning the name of a printing apparatus acquired in step S903, information concerning the type of a printing apparatus acquired in step S904, and information concerning the connection configuration of a printing apparatus acquired in step S905, determines whether each of such pieces of information or a combination of some of such pieces of information corresponds to a printing system in which the print restriction information exits. Thus, the print data editing unit 208 determines whether the printing system including the extension application 204 is a printing system including the printing apparatus-compatible cloud printing service 1003. If the result of determination in step S907 is yes (YES in step S907), the print data editing unit 208 advances the processing to step S911, and, if the result of determination in step S907 is no (NO in step S907), the print data editing unit 208 advances the processing to step S908. Specifically, a case where the acquired print restriction target list is the one illustrated in FIG. 6 is described as an example. The print restriction target list illustrated in FIG. 6 indicates that, in a case where the type of a printing apparatus is an inkjet printer and the connection configuration is an indirect communication configuration, the printing system including the extension application 204 corresponds to a printing system in which the print restriction information exits. In a case where the inkjet printer has an indirect communication configuration, the print data editing unit 208 determines that the printing system including the extension application 204 corresponds to a printing system in which the print restriction information exits, with use of information concerning the type of a printing apparatus and information concerning the connection configuration acquired until step S905 and the print restriction target list illustrated in FIG. 6. Moreover, the print restriction target list illustrated in FIG. 6 indicates that, in a case where the type of a printing apparatus is a laser beam printer and the connection configuration is an indirect communication configuration, the printing system including the extension application 204 does not correspond to a printing system in which the print restriction information exits. In this case, the print data editing unit 208 determines that the printing system including the extension application 204 does not correspond to a printing system in which the print restriction information exits, with use of information concerning the type of a printing apparatus and information concerning the connection configuration acquired until step S905 and the print restriction target list illustrated in FIG. 6.

In step S908, the print data editing unit 208 determines whether the connection configuration is a direct communication configuration or an indirect communication configuration. If the result of determination in step S908 is yes (YES in step S908), the print data editing unit 208 advances the processing to step S917, and, if the result of determination in step S908 is no (NO in step S908), the print data editing unit 208 advances the processing to step S909. Furthermore, in a case where the connection configuration is an indirect communication configuration (if the result of determination in step S908 is yes), the print data editing unit 208 is able to determine that the printing system including the extension application 204 does not correspond to a printing system in which the print restriction information exits, based on processing operations in steps S907 and S908, and, therefore, advances the processing to step S917. For example, in a case where the print restriction target list illustrated in FIG. 6 has been acquired and the laser beam printer has an indirect communication configuration based on information concerning the type of a printing apparatus and information concerning the connection configuration acquired until step S905, the result of determination in step S908 is yes.

Processing operations in steps S909 and S910 are processing operations similar to those in steps S507 and S508 illustrated in FIG. 5, and are, therefore, omitted from description.

In step S911, the print data editing unit 208 acquires information concerning the type of a cloud printing related service, to determine from which type of cloud printing related service to acquire the print restriction detailed list. The type of a cloud printing related service is information indicating the cloud printing intermediary service 1002 or information indicating the printing apparatus-compatible cloud printing service 1003. Specifically, the print data editing unit 208 acquires a printing apparatus-compatible cloud printing service list illustrated in FIG. 10 from the shared information 210. The printing apparatus-compatible cloud printing service list is a list indicating from which type of cloud printing related service to acquire the print restriction detailed list, based on information concerning the name of a printing apparatus, information concerning the type of a printing apparatus, information concerning the connection configuration of a printing apparatus, and a combination of some of such pieces of information. The print data editing unit 208 refers to the printing apparatus-compatible cloud printing service list illustrated in FIG. 10 and determines the type of a cloud printing related service from which to acquire the print restriction detailed list, based on information concerning the name of a printing apparatus, information concerning the type of a printing apparatus, information concerning the connection configuration of a printing apparatus, and a combination of some of such pieces of information acquired by processing operations performed until step S905 in the present flowchart. For example, in a case where a combination of information concerning the type of a printing apparatus and information concerning the connection configuration acquired by the print data editing unit 208 in processing operations performed until step S905 in the present flowchart is an inkjet printer and an indirect communication configuration, the print data editing unit 208 determines that the type of a cloud printing related service from which to acquire the print restriction detailed list is a cloud printing intermediary service A, based on the printing apparatus-compatible cloud printing service list illustrated in FIG. 10. Furthermore, the cloud printing intermediary service A represents an example of the name of the cloud printing intermediary service 1002, and the cloud printing intermediary service A being set forth in the printing apparatus-compatible cloud printing service list indicates that a print restriction is also provided to the printing apparatus-compatible cloud printing service 1003 associated with the cloud printing intermediary service A. Furthermore, an example of the name of the printing apparatus-compatible cloud printing service 1003 can also be set forth in the printing apparatus-compatible cloud printing service list.

In step S912, the print data editing unit 208 acquires print restriction detailed information from the cloud printing related service determined based on the printing apparatus-compatible cloud printing service list.

For example, in a case where a combination of information concerning the type of a printing apparatus and information concerning the connection configuration acquired by the print data editing unit 208 in processing operations performed until step S905 in the present flowchart is information indicating an inkjet printer and information indicating an indirect communication configuration, the print data editing unit 208 acquires print restriction detailed information from the cloud printing intermediary service A set forth in the printing apparatus-compatible cloud printing service list illustrated in FIG. 10.

Processing operations in steps S913 to S917 are processing operations similar to those in steps S509 to S513 illustrated in FIG. 5, and are, therefore, omitted from description.

As described above, according to a connection configuration in print processing, the print data editing unit 208 is able to switch between acquiring a print restriction detailed list from the shared information 210 and acquiring a print restriction detailed list from the printing apparatus-compatible cloud printing service 1003. This enables reducing a situation in which a time arises when the values of a print restriction set forth in the print restriction detailed list and the actual values of a print restriction provided in the printing apparatus-compatible cloud printing service 1003 are different from each other. Moreover, this enables saving the trouble of performing updating of the print restriction detailed list.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-030018, filed Feb. 28, 2022, which is hereby incorporated by reference herein in its entirety.

What is claimed is:

1. A non-transitory computer-readable storage medium storing computer-executable instructions that, when executed by a computer of an information processing apparatus capable of communicating with a printing apparatus, cause the computer to perform a method comprising:

acquiring print data on which print processing is to be performed by the printing apparatus;

acquiring information concerning the printing apparatus;

determining whether a system related to the printing apparatus corresponds to a system including a server, based on the acquired information concerning the printing apparatus, the server being located outside the information processing apparatus and being capable of communicating with the printing apparatus;

if it is determined that the system related to the printing apparatus corresponds to a system including the server, acquiring printing restriction information concerning the server and performing notification about an error in which print processing is not performed, wherein the notification is performed in a case where information concerning the print data satisfies a predetermined condition indicated by the acquired printing restriction information; and if it is determined that the system related to the printing apparatus does not correspond to a system including the server, without acquiring the printing restriction information, transmitting the print data to the printing apparatus.

2. The non-transitory computer-readable storage medium according to claim 1, wherein the method further comprises, in a case where the information concerning the print data satisfies the predetermined condition indicated by the acquired printing restriction information, performing control not to transmit the print data to the printing apparatus.

3. The non-transitory computer-readable storage medium according to claim 1, wherein the method further comprises, in a case where the information concerning the print data does not satisfy the predetermined condition indicated by the acquired printing restriction information, without performing the notification, transmitting the print data to the printing apparatus.

4. The non-transitory computer-readable storage medium according to claim 3, wherein the transmitting of the print data includes transmitting the print data to the printing apparatus via the server.

5. The non-transitory computer-readable storage medium according to claim 3, wherein the transmitting of the print data includes transmitting the print data to the printing apparatus not via the server but via an external server different from the server.

6. The non-transitory computer-readable storage medium according to claim 1, wherein the information concerning the printing apparatus includes at least one of information concerning a name of the printing apparatus, information concerning a type of the printing apparatus, and information concerning a connection configuration between the printing apparatus and the information processing apparatus.

7. The non-transitory computer-readable storage medium according to claim 6, wherein the information concerning the connection configuration includes at least one of information indicating a first connection configuration in which the printing apparatus and the information processing apparatus are able to communicate with each other without via cloud computing and information indicating a second connection configuration in which the printing apparatus and the information processing apparatus are able to communicate with each other via cloud computing.

8. The non-transitory computer-readable storage medium according to claim 6, wherein the information concerning the type of the printing apparatus includes at least one of information indicating that the printing apparatus is an inkjet printer and information indicating that the printing apparatus is a laser beam printer.

9. The non-transitory computer-readable storage medium according to claim 1, wherein the method further comprises, in a case where information concerning a type of the printing apparatus included in the information concerning the printing apparatus is information indicating that the printing apparatus is a laser beam printer, determining that the system related to the printing apparatus does not correspond to the system including the server, and, without acquiring the printing restriction information and without performing the notification, transmitting the print data to the printing apparatus.

10. The non-transitory computer-readable storage medium according to claim 1, wherein the method further comprises:

in a case where information concerning a type of the printing apparatus included in the information concerning the printing apparatus is information indicating that the printing apparatus is an inkjet printer, determining that the system related to the printing apparatus corresponds to the system including the server, and acquiring the printing restriction information;

in a case where the printing restriction information has been acquired, determining whether the information concerning the print data satisfies the predetermined condition indicated by the acquired printing restriction information;

in a case where it is determined that the information concerning the print data satisfies the predetermined condition indicated by the acquired printing restriction information, performing the notification and performing control not to transmit the print data to the printing apparatus; and in a case where it is determined that the information concerning the print data does not satisfy the predetermined condition indicated by the acquired printing restriction information, without performing the notification, transmitting the print data to the printing apparatus.

11. The non-transitory computer-readable storage medium according to claim 1, wherein the printing restriction information is acquired from a shared information unit stored in the computer-executable instructions.

12. The non-transitory computer-readable storage medium according to claim 1, wherein the printing restriction information is acquired from an external server located outside the information processing apparatus and different from the server.

13. The non-transitory computer-readable storage medium according to claim 1, wherein the printing restriction information is acquired from the server.

14. The non-transitory computer-readable storage medium according to claim 1, wherein the printing restriction information includes at least one of a value indicating a number of pages of the print data and a value indicating a data size of the print data.

15. The non-transitory computer-readable storage medium according to claim 1, wherein the print data has a data format not yet converted into data which the printing apparatus is able to interpret.

16. The non-transitory computer-readable storage medium according to claim 1, wherein the print data is data which the printing apparatus is able to interpret.

17. The non-transitory computer-readable storage medium according to claim 1, wherein the server is any one of a first server and a second server which are capable of communicating with each other, and wherein the printing restriction information is restriction information concerning any one of the first server and the second server.

18. The non-transitory computer-readable storage medium according to claim 17, wherein the first server is a server which is not capable of communicating with a third server, the printing apparatus being not capable of communicating with the third server, and wherein the second server is a server which is capable of communicating with the third server.

19. The non-transitory computer-readable storage medium according to claim 1, wherein the predetermined condition is a condition indicating that an error, in which print processing of the print data is not performed, occurs.

20. An information processing apparatus capable of communicating with a printing apparatus, the information processing apparatus comprising:

at least one processor configured to:

acquire print data on which print processing is to be performed by the printing apparatus;

acquire information concerning the printing apparatus;

determine whether a system related to the printing apparatus corresponds to a system including a server, based on the acquired information concerning the printing apparatus, the server being located outside the information processing apparatus and being capable of communicating with the printing apparatus;

if it is determined that the system related to the printing apparatus corresponds to a system including the server, acquire printing restriction information concerning the server and perform notification about an error in which print processing is not performed, wherein the notification is performed in a case where information concerning the print data satisfies a predetermined condition indicated by the acquired printing restriction information; and if it is determined that the system related to the printing apparatus does not correspond to a system including the server, without acquiring the printing restriction information, transmit the print data to the printing apparatus.

21. A control method for an information processing apparatus capable of communicating with a printing apparatus, the control method comprising:

acquiring print data on which print processing is to be performed by the printing apparatus;

acquiring information concerning the printing apparatus;

determining whether a system related to the printing apparatus corresponds to a system including a server, based on the acquired information concerning the printing apparatus, the server being located outside the information processing apparatus and being capable of communicating with the printing apparatus;

if it is determined that the system related to the printing apparatus corresponds to a system including the server, acquiring printing restriction information concerning the server and performing notification about an error in which print processing is not performed, wherein the notification is performed in a case where information concerning the print data satisfies a predetermined condition indicated by the acquired printing restriction information; and if it is determined that the system related to the printing apparatus does not correspond to a system including the server, without acquiring the printing restriction information, transmitting the print data to the printing apparatus.

* * * * *